(12) United States Patent
Bellaci et al.

(10) Patent No.: US 11,162,505 B2
(45) Date of Patent: Nov. 2, 2021

(54) IMPELLER WITH PROTECTION ELEMENTS AND CENTRIFUGAL COMPRESSOR

(71) Applicant: Nuovo Pignone Srl, Florence (IT)

(72) Inventors: Michelangelo Bellaci, Florence (IT); Andrea Massini, Florence (IT); Massimo Giannozzi, Florence (IT); Iacopo Giovannetti, Florence (IT)

(73) Assignee: Nuovo Pignone SRL, Florence (IT)

( * ) Notice: Subject to any disclaimer, the term of this patent is extended or adjusted under 35 U.S.C. 154(b) by 545 days.

(21) Appl. No.: 15/104,052

(22) PCT Filed: Dec. 15, 2014

(86) PCT No.: PCT/EP2014/077707
§ 371 (c)(1),
(2) Date: Jun. 13, 2016

(87) PCT Pub. No.: WO2015/091330
PCT Pub. Date: Jun. 25, 2015

(65) Prior Publication Data
US 2016/0312791 A1 Oct. 27, 2016

(30) Foreign Application Priority Data
Dec. 17, 2013 (IT) .......................... CO2013A000067

(51) Int. Cl.
*F04D 29/28* (2006.01)
*F04D 29/02* (2006.01)
(Continued)

(52) U.S. Cl.
CPC ......... *F04D 29/289* (2013.01); *F04D 29/023* (2013.01); *F04D 29/284* (2013.01);
(Continued)

(58) Field of Classification Search
None
See application file for complete search history.

(56) References Cited

U.S. PATENT DOCUMENTS 2,398,203 A * 4/1946 Browne ................ F04D 29/285
                                                    415/143
2,399,852 A * 5/1946 Campbell ............... F01D 5/045
                                                    415/143
(Continued)

FOREIGN PATENT DOCUMENTS

CN           86101358 A    12/1986
CN            1372082 A    10/2002
(Continued)

OTHER PUBLICATIONS

Unofficial English Japanese Office Action issued in connection with related JP Application No. 2012541139 dated Dec. 6, 2016.
(Continued)

*Primary Examiner* — Kenneth Rinehart
*Assistant Examiner* — Richard K. Durden
(74) *Attorney, Agent, or Firm* — Baker Hughes Patent Organization

(57) ABSTRACT

The impeller includes a main body with a root, a shroud and a plurality of blades connecting the root and the shroud. Protection elements are associated to the blades and constitute at least the front part of the blades. The protection elements may consist of separate bodies or may be grouped together to form one or more protection bodies. In an embodiment, the material of the protection elements is different from the material of the main body, and may be, for example, a cobalt base alloy having a chromium content greater than 20% or nickel base alloy having a chromium content greater than 12%.

12 Claims, 7 Drawing Sheets

(51) Int. Cl.
  *B22F 5/10* (2006.01)
  *B22F 3/15* (2006.01)
  *B23P 15/00* (2006.01)
  *B22F 10/20* (2021.01)
  *F04D 29/30* (2006.01)

(52) U.S. Cl.
  CPC . *B22F 3/15* (2013.01); *B22F 5/10* (2013.01); *B22F 10/20* (2021.01); *B23P 15/006* (2013.01); *F04D 29/30* (2013.01); *F05D 2230/22* (2013.01); *F05D 2230/23* (2013.01); *F05D 2230/31* (2013.01); *F05D 2230/42* (2013.01); *F05D 2240/303* (2013.01); *F05D 2300/10* (2013.01); *Y02P 10/25* (2015.11)

(56) References Cited

U.S. PATENT DOCUMENTS

| | | | |
|---|---|---|---|
| 2,401,206 A * | 5/1946 | Van Rijswijk | F04D 29/285 |
| | | | 415/143 |
| 2,440,317 A * | 4/1948 | Welsh | F04D 29/2294 |
| | | | 416/186 R |
| 2,463,581 A * | 3/1949 | Welsh | F04D 29/2294 |
| | | | 416/186 R |
| 2,517,477 A | 8/1950 | Griffin | |
| 2,868,439 A | 1/1959 | Hampshire et al. | |
| 3,189,671 A | 6/1965 | Babb | |
| 3,403,844 A | 10/1968 | Stoffer | |
| 3,554,668 A | 1/1971 | Wagle | |
| 3,680,979 A | 8/1972 | Hansen et al. | |
| 3,762,835 A | 10/1973 | Carlson et al. | |
| 3,797,965 A * | 3/1974 | Tonooka | F03B 3/125 |
| | | | 416/186 R |
| 3,846,045 A | 11/1974 | Mincuzzi | |
| 4,183,719 A | 1/1980 | Bozung | |
| 4,243,199 A | 1/1981 | Hill | |
| 4,363,602 A | 12/1982 | Martin | |
| 4,428,717 A * | 1/1984 | Catterfeld | F04D 7/04 |
| | | | 29/889.4 |
| 4,435,126 A | 3/1984 | Schneider | |
| 4,563,801 A * | 1/1986 | Schill | B23K 31/025 |
| | | | 228/193 |
| 4,676,722 A | 6/1987 | Marchal et al. | |
| 4,697,987 A | 10/1987 | Katayama et al. | |
| 4,747,722 A | 5/1988 | Kawaguchi et al. | |
| 4,747,900 A | 5/1988 | Angus | |
| 4,767,277 A | 8/1988 | Buse | |
| 4,797,064 A | 1/1989 | Ferris et al. | |
| 4,850,802 A | 7/1989 | Pankratz et al. | |
| 4,877,376 A | 10/1989 | Sikorski et al. | |
| 4,879,483 A * | 11/1989 | Barahia | F04D 29/281 |
| | | | 310/63 |
| 5,022,823 A | 6/1991 | Edelmayer | |
| 5,201,635 A | 4/1993 | Steinmetz | |
| 5,263,823 A | 11/1993 | Cabaret et al. | |
| 5,285,699 A | 2/1994 | Walls et al. | |
| 5,435,960 A | 7/1995 | Bressler et al. | |
| 5,449,273 A | 9/1995 | Hertel et al. | |
| 5,538,395 A | 7/1996 | Hager | |
| 5,539,395 A | 7/1996 | Buss et al. | |
| 5,632,601 A | 5/1997 | Bodmer et al. | |
| 5,725,353 A | 3/1998 | Matheny et al. | |
| 5,775,878 A | 7/1998 | Maumus et al. | |
| 5,779,449 A | 7/1998 | Klein | |
| 5,795,138 A | 8/1998 | Gozdawa | |
| 5,800,128 A | 9/1998 | Bodmer et al. | |
| 5,845,398 A | 12/1998 | Maumus et al. | |
| 6,025,072 A | 2/2000 | Goto et al. | |
| 6,033,183 A | 3/2000 | Genster | |
| 6,033,612 A | 3/2000 | Adams et al. | |
| 6,126,395 A | 10/2000 | Shingai | |
| 6,146,094 A | 11/2000 | Obana et al. | |
| 6,209,420 B1 * | 4/2001 | Butcher | B22F 3/1055 |
| | | | 419/28 |
| 6,264,430 B1 | 7/2001 | Hulkkonen et al. | |
| 6,402,467 B1 | 6/2002 | Godichon et al. | |
| 6,481,917 B1 | 11/2002 | Chen et al. | |
| 6,592,329 B1 | 7/2003 | Hirose et al. | |
| 6,805,531 B2 | 10/2004 | Iida et al. | |
| 6,854,960 B2 | 2/2005 | Van Dine et al. | |
| 7,172,821 B2 | 2/2007 | Sugiyama et al. | |
| 7,491,032 B1 | 2/2009 | Powell et al. | |
| 7,985,306 B2 | 7/2011 | Chen et al. | |
| 8,133,009 B2 | 3/2012 | Salvesen | |
| 8,297,922 B2 * | 10/2012 | Cruickshank | F04D 29/2294 |
| | | | 416/1 |
| 2002/0157250 A1 * | 10/2002 | Haendler | F01D 5/34 |
| | | | 29/889.7 |
| 2004/0224590 A1 | 11/2004 | Rawa et al. | |
| 2004/0241000 A1 | 12/2004 | Godichon et al. | |
| 2005/0100442 A1 | 5/2005 | Clement | |
| 2006/0291996 A1 | 12/2006 | Kubota et al. | |
| 2007/0098556 A1 | 5/2007 | Sanagi et al. | |
| 2008/0298971 A1 | 12/2008 | Pinzauti et al. | |
| 2009/0110556 A1 | 4/2009 | Jahnz | |
| 2009/0142196 A1 | 6/2009 | Gerhardt et al. | |
| 2009/0304519 A1 | 12/2009 | Yasui et al. | |
| 2010/0028141 A1 * | 2/2010 | Nishida | F04D 17/122 |
| | | | 415/198.1 |
| 2011/0014059 A1 | 1/2011 | Giovannetti et al. | |
| 2011/0194941 A1 | 8/2011 | Parkin et al. | |
| 2011/0200439 A1 * | 8/2011 | Nakaniwa | F04D 29/023 |
| | | | 416/189 |
| 2013/0004316 A1 | 1/2013 | Matwey | |
| 2013/0017067 A1 | 1/2013 | Cantelli | |
| 2013/0043161 A1 | 1/2013 | Hoehn et al. | |
| 2014/0127021 A1 * | 5/2014 | Chiovelli | F01D 5/12 |
| | | | 416/179 |
| 2015/0377246 A1 * | 12/2015 | Tieu | F04D 29/2266 |
| | | | 416/189 |
| 2016/0312789 A1 * | 10/2016 | Moon | F04D 29/2294 |

FOREIGN PATENT DOCUMENTS

| | | | | |
|---|---|---|---|---|
| CN | 1410680 A | 4/2003 | | |
| CN | 2643047 Y | 9/2004 | | |
| CN | 1537193 A | 10/2004 | | |
| CN | 1584103 A | 2/2005 | | |
| CN | 1842657 A | 10/2006 | | |
| CN | 101133188 A | 2/2008 | | |
| CN | 101315083 A | 12/2008 | | |
| CN | 201507475 U | 6/2010 | | |
| CN | 102203428 A | 9/2011 | | |
| DE | 462853 C * | 7/1928 | ........... | F04D 29/285 |
| DE | 2027861 A1 | 12/1971 | | |
| DE | 8519005 U1 | 2/1986 | | |
| DE | 3711489 A1 | 10/1987 | | |
| DE | 4139293 A1 | 6/1993 | | |
| DE | 4409629 A1 | 9/1994 | | |
| DE | 10039971 A1 | 5/2001 | | |
| DE | 10104170 A1 | 8/2002 | | |
| DE | 202005021324 U1 | 10/2007 | | |
| EP | 0206031 A1 | 12/1986 | | |
| EP | 0754863 A1 | 1/1997 | | |
| EP | 0800012 A2 | 10/1997 | | |
| EP | 0995538 A1 | 4/2000 | | |
| EP | 2325495 A2 | 5/2011 | | |
| EP | 2395246 A1 | 12/2011 | | |
| GB | 1386937 A | 3/1975 | | |
| GB | 2258032 A | 1/1993 | | |
| JP | 35020565 Y | 8/1960 | | |
| JP | 5428007 A | 3/1979 | | |
| JP | 5434107 A | 3/1979 | | |
| JP | 56132499 A | 10/1981 | | |
| JP | 59150997 A | 8/1984 | | |
| JP | 61252895 A | 11/1986 | | |
| JP | 62279913 A | 12/1987 | | |
| JP | 6329098 A | 2/1988 | | |
| JP | 03141898 A | 6/1991 | | |
| JP | 03210024 A | 9/1991 | | |
| JP | 03106195 U | 11/1991 | | |
| JP | 0763193 A | 3/1995 | | |

(56) References Cited

FOREIGN PATENT DOCUMENTS

| | | |
|---|---|---|
| JP | 08224748 A | 9/1996 |
| JP | 094598 A | 1/1997 |
| JP | 09105304 A | 1/1997 |
| JP | 09126185 A | 5/1997 |
| JP | 09195987 A | 7/1997 |
| JP | 09510529 A | 10/1997 |
| JP | 11324982 A | 11/1999 |
| JP | 11324983 A | 11/1999 |
| JP | 2001124101 A | 5/2001 |
| JP | 2001140789 A | 5/2001 |
| JP | 2003247084 A | 9/2003 |
| JP | 2004036444 A | 2/2004 |
| JP | 2006161635 A | 6/2006 |
| JP | 2007312576 A | 11/2007 |
| JP | 2008169799 A | 7/2008 |
| JP | 2009510305 A | 3/2009 |
| JP | 2010-121612 A | 6/2010 |
| JP | 2010180477 A | 8/2010 |
| JP | 2010229894 A | 10/2010 |
| JP | 2011027104 A | 2/2011 |
| JP | 2011-236491 A | 11/2011 |
| JP | 2011-241704 A | 12/2011 |
| JP | 2011-241831 A | 12/2011 |
| JP | 2012-077643 A | 4/2012 |
| JP | 2013-006236 A | 1/2013 |
| RU | 2113626 C1 | 6/1998 |
| RU | 2231414 C2 | 6/2004 |
| RU | 2239100 C2 | 10/2004 |
| RU | 54 113 U1 | 6/2006 |
| RU | 2280530 C1 | 7/2006 |
| RU | 2280767 C2 | 7/2006 |
| RU | 2290285 C2 | 12/2006 |
| RU | 2296245 C1 | 3/2007 |
| SU | 879045 A1 | 11/1981 |
| SU | 1565574 A1 | 5/1990 |
| SU | 1701984 A1 | 12/1991 |

OTHER PUBLICATIONS

U.S. Non-Final Office Action issued in connection with related U.S. Appl. No. 14/365,253 dated Dec. 27, 2016.

Unofficial English Russian Office Action issued in connection with related RU Application No. 2014121784 dated Jan. 30, 2017.

U.S. Non-Final Office Action issued in connection with related U.S. Appl. No. 14/642,844 dated Feb. 17, 2017.

Unofficial English Japanese Office Action issued in connection with related JP Application No. 2014546420 dated Mar. 14, 2017.

U.S. Notice of Allowance issued in connection with related U.S. Appl. No. 13/511,627 dated Mar. 24, 2017.

International Search Report and Written Opinion issued in connection with corresponding PCT application PCT/EP2014/044407 dated Mar. 26, 2015.

Giovannetti, L., et al., Centrifugal Impeller Of The Closed Type For Turbomachinery, Component For Such Impeller, Turbomachinery Provided With Such Impeller And Method For Making Such Impeller, GE Co-Pending Application No. MI2009A000781, filed on May 8, 2009.

Giovannetti, L., et al., Centrifugal Impeller And Turbomachine, GE Co-Pending Application No. CO2009A000049, filed on Nov. 23, 2009.

Baehmann, P.L., et al., Rotary machine including a machine rotor with a composite impeller ponion and a metal shaft portion, GE Co-Pending Application No. CO2011A000064, filed on Dec. 14, 2011.

First Office Action and Search issued in connection with corresponding CN Application No. 201480069345.0 dated Apr. 3, 2018.

Office Action issued in connection with corresponding RU Application No. 2016122901 dated Jul. 19, 2018.

Iacopo Giovannetti et al., filed Mar. 10, 2015, U.S. Appl. No. 14/642,844.

Peggy Lynn Baehmann et al., filed Jun. 13, 2014, U.S. Appl. No. 14/365,253.

Massimo Giannozzi et al., filed Oct. 8, 2012, U.S. Appl. No. 13/511,621.

Massimo Gainnozzi et al., filed Sep. 28, 2012, U.S. Appl. No. 13/511,627.

Orlov, "Thermal Shrink Fit", Shrink-Fitted Joints, pp. 236-237.

Unofficial English Italian Search Report and Written Opinion issued in connection with related IT Application No. MI2009A000781 dated Nov. 18, 2009.

Unofficial English Italian Search Report and Written Opinion issued in connection with related IT Application No. CO2009A000049 dated Jun. 24, 2010.

Unofficial English Italian Search Report and Written Opinion issued in connection with related IT Application No. CO2009A000050 dated Jul. 15, 2010.

PCT Search Report and Written Opinion issued in connection with related PCT Application No. PCT/EP2010/056289 dated Jul. 28, 2010.

European Search Report and Opinion issued in connection with related EP Application No. 10162055.7 dated Sep. 2, 2010.

PCT Search Report and Written Opinion issued in connection with related PCT Application No. PCT/US2010/057623 dated Mar. 31, 2011.

PCT Search Report and Written Opinion issued in connection with related PCT Application No. PCT/US2010/057626 dated Apr. 28, 2011.

Unofficial English Italian Search Report and Written Opinion issued in connection with related IT Application No. CO20110064 dated Jun. 6, 2012.

PCT Search Report and Written Opinion issued in connection with corresponding PCT Application No. PCT/EP12/74619 dated Feb. 5, 2013.

Unofficial English Chinese Office Action issued in connection with related CN Application No. 201080030778.7 dated Oct. 24, 2013.

Unofficial English Kazakhstan Office Action issued in connection with related KZ Application No. 2012/1556.1 dated Dec. 5, 2013.

Unofficial English Kazakhstan Office Action issued in connection with related KZ Application No. 2012/1557.1 dated Dec. 5, 2013.

Unofficial English Japanese Office Action issued in connection with related JP Application No. 2012-509058 dated Feb. 25, 2014.

Unofficial English Russian Office Action issued in connection with related RU Application No. 2011144881 dated Mar. 19, 2014.

Unofficial English Kazakhstan Notice of Allowance issued in connection with related KZ Application No. 2012/1557.1 dated May 28, 2014.

U.S. Non-final Office Action issued in connection with related U.S. Appl. No. 13/319,493 dated Jun. 11, 2014.

Unofficial English Chinese Office Action issued in connection with related CN Application No. 201080062113.4 dated Jun. 26, 2014.

Unofficial English Chinese Office Action issued in connection with related CN Application No. 201080062105.X dated Jul. 3, 2014.

Unofficial English Mexican Office Action issued in connection with related MX Application No. MX/A/2012/005950 dated Jul. 17, 2014.

Unofficial English Russian Office Action issued in connection with related RU Application No. 2011144881 dated Jul. 30, 2014.

Unofficial English Chinese Office Action issued in connection with related CN Application No. 201080030778.7 dated Jul. 31, 2014.

Unofficial English Egyptian Office Action issued in connection with related EG Application No. PCT/921/2012 dated Aug. 20, 2014.

Unofficial English Egyptian Office Action issued in connection with related EG Application No. PCT/922/2012 dated Aug. 20, 2014.

Unofficial English Italian Search Report and Written Opinion issued in connection with related IT Application No. CO2013A000067 dated Sep. 17, 2014.

Unofficial English Japanese Office Action issued in connection with related JP Application No. 2012541139 dated Sep. 24, 2014.

Unofficial English Russian Office Action issued in connection with related RU Application No. 2012122728 dated Sep. 24, 2014.

Unofficial English Russian Office Action issued in connection with related RU Application No. 2012120919 dated Sep. 26, 2014.

(56) References Cited

OTHER PUBLICATIONS

Unofficial English Japanese Office Action issued in connection with related JP Application No. 2012509058 dated Oct. 21, 2014.
Unofficial English Japanese Office Action issued in connection with related JP Application No. 2012541140 dated Oct. 21, 2014.
Unofficial English Mexican Office Action issued in connection with related MX Application No. MX/A/2012/005955 dated Oct. 28, 2014.
Unofficial English Egyptian Office Action issued in connection with related EG Application No. PCT 921/2012 dated Dec. 17, 2014.
Unofficial English Russian Office Action issued in connection with related RU Application No. 2011144881 dated Dec. 23, 2014.
Unofficial English Chinese Office Action issued in connection with related CN Application No. 201280061611.6 dated Feb. 4, 2015.
Unofficial English Japanese Office Action issued in connection with related JP Application No. 2012541140 dated Feb. 10, 2015.
Unofficial English Japanese Notice of Allowance issued in connection with related JP Application No. 2012541140 dated May 26, 2015.
Australian Office Action issued in connection with related AU Application No. 2010321705 dated Jun. 29, 2015.
Unofficial English Japanese Office Action issued in connection with related JP Application No. 2012541139 dated Jul. 7, 2015.
Australian Office Action issued in connection with related AU Application No. 2010321706 dated Jul. 10, 2015.
Unofficial English Egyptian Office Action issued in connection with related EG Application No. PCT922/2012 dated Jul. 25, 2015.
Unofficial English Japanese Office Action issued in connection with related JP Application No. 2012509058 dated Aug. 4, 2015.
Unofficial English Russian Notice of Allowance issued in connection with related RU Application No. 2012122728 dated Aug. 26, 2015.
Unofficial English Russian Office Action issued in connection with related RU Application No. 2011144881 dated Sep. 21, 2015.
U.S. Non-Final Office Action issued in connection with related U.S. Appl. No. 13/511,627 dated Dec. 21, 2015.
Unofficial English Japanese Office Action issued in connection with related JP Application No. 2012509058 dated Feb. 23, 2016.
Australian Notice of Allowance issued in connection with elated AU Application No. 2010321705 dated Apr. 11, 2016.
U.S. Final Office Action issued in connection with elated U.S. Appl. No. 13/511,627 dated Jun. 15, 2016.
Unofficial English Japanese Office Action issued in connection with related JP Application No. 2014546420 dated Sep. 20, 2016.
Unofficial English Russian Office Action issued in connection with related RU Application No. 2014121784 dated Sep. 27, 2016.
European Search Report and Opinion issued in connection with related EP Application No. 10808954.1 dated Oct. 21, 2016.
Machine Translation and Notification of reasons for refusal issued in connection with corresponding JP Application No. 2016-539308 dated Oct. 30, 2018.

* cited by examiner

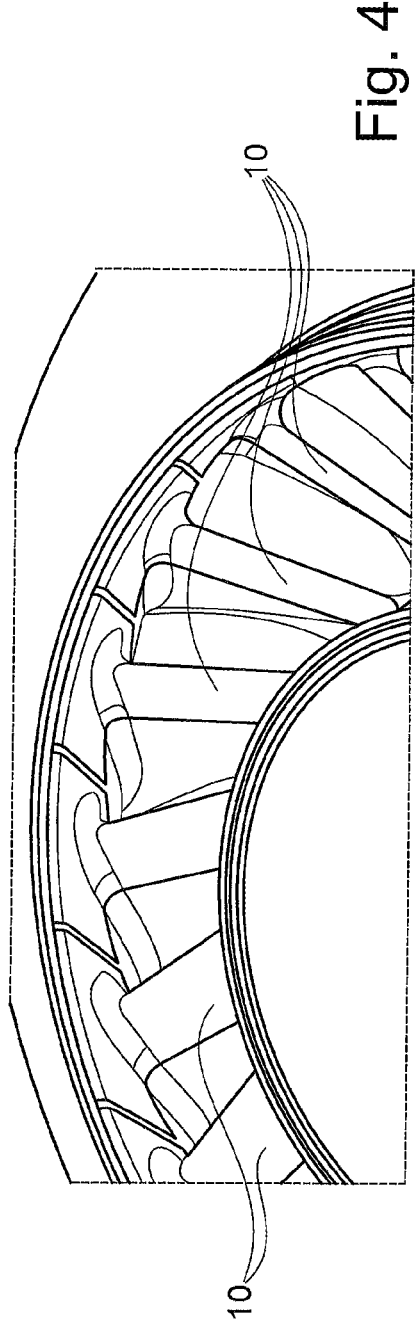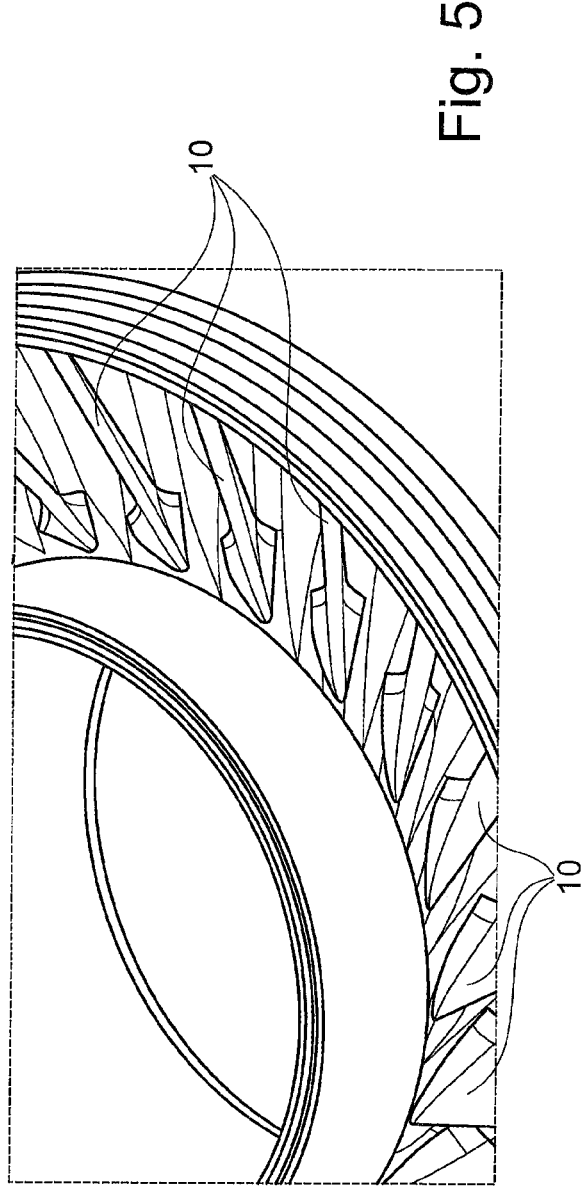

IMPELLER WITH PROTECTION ELEMENTS AND CENTRIFUGAL COMPRESSOR

TECHNICAL FIELD

Embodiments of the subject matter disclosed herein generally relate to impellers with protection elements and methods for protecting an impeller, as well as centrifugal compressors and machines.

These components and systems have been conceived and are particularly useful in the field of "Oil & Gas" as they are protected from e.g. liquid droplets erosion.

BACKGROUND

As it is known, impellers are subject to erosion; in some cases or some operating conditions, erosion is due for example to solid particles (such as sand grains) being at the inlet of the impeller and hitting against the surfaces of the impeller; in other cases or other operating conditions, erosion is due for example to liquid droplets being at the inlet of the impeller and hitting against the surfaces of the impeller; of course, other types of erosion exist.

A first way to reduce erosion is by means of filters and/or separators connected to the inlet of the impeller upstream thereof.

A second way to reduce erosion is by selecting the material of the impeller so that its surfaces can withstand the impacts of solid particles and/or liquid droplets.

Filters and separators are costly and bulky and require maintenance.

Materials that are very good in resisting to erosion are often not very good in terms of mechanical properties; therefore, the material of the impeller is selected as a compromise between erosion resistance of its surfaces and mechanical resistance of its body.

It has to be considered that, in some applications, an impeller operates normally with no particles and no droplets at its inlet, and only sometimes it operates with particles and/or droplets at its inlet.

Therefore, there is a general need for solutions to the problem of erosion, in particular liquid droplets erosion in centrifugal compressors.

BRIEF DESCRIPTION

By arranging protection elements associated to the blades of the impeller at the front part thereof, this problem is effectively solved. This allows to use different materials for the main body of the impeller and for the body or bodies of the protection elements.

A first aspect of the present invention is an impeller.

Embodiments of the impeller include a main body with a root, a shroud, and a plurality of blades connecting the root and the shroud. The protection elements are associated to the blades and constitute at least the front part of the blades.

A second aspect of the present invention is a centrifugal compressor.

Embodiments of the centrifugal compressor include an impeller as set out above.

A third aspect of the present invention is a compressor machine.

Embodiments of the machine for compressing an input fluid at its inlet include a centrifugal compressor as set out above for compressing the input fluid.

A fourth aspect of the present invention is a protection method.

Embodiments of the invention relate to a method of protecting the front side of an impeller of a centrifugal compressor from impacts of liquid droplets in the input fluid flow. The method includes the step of permanently arranging protection elements at the front side of the impeller. The protection elements are made of a cobalt base alloy, a nickel base alloy, a titanium base alloy, a precipitation hardening stainless steel, or a martensitic stainless steel.

BRIEF DESCRIPTION OF THE DRAWINGS

The accompanying drawings, which are incorporated herein and constitute a part of the specification, illustrate exemplary embodiments of the present invention and, together with the detailed description, explain these embodiments. In the drawings:

FIG. 4 shows a first detail of the impeller of FIG. 3, FIG. 5 shows a second detail of the impeller of FIG. 3.

DETAILED DESCRIPTION

The following description of exemplary embodiments refers to the accompanying drawings.

The following description does not limit embodiments of the present invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
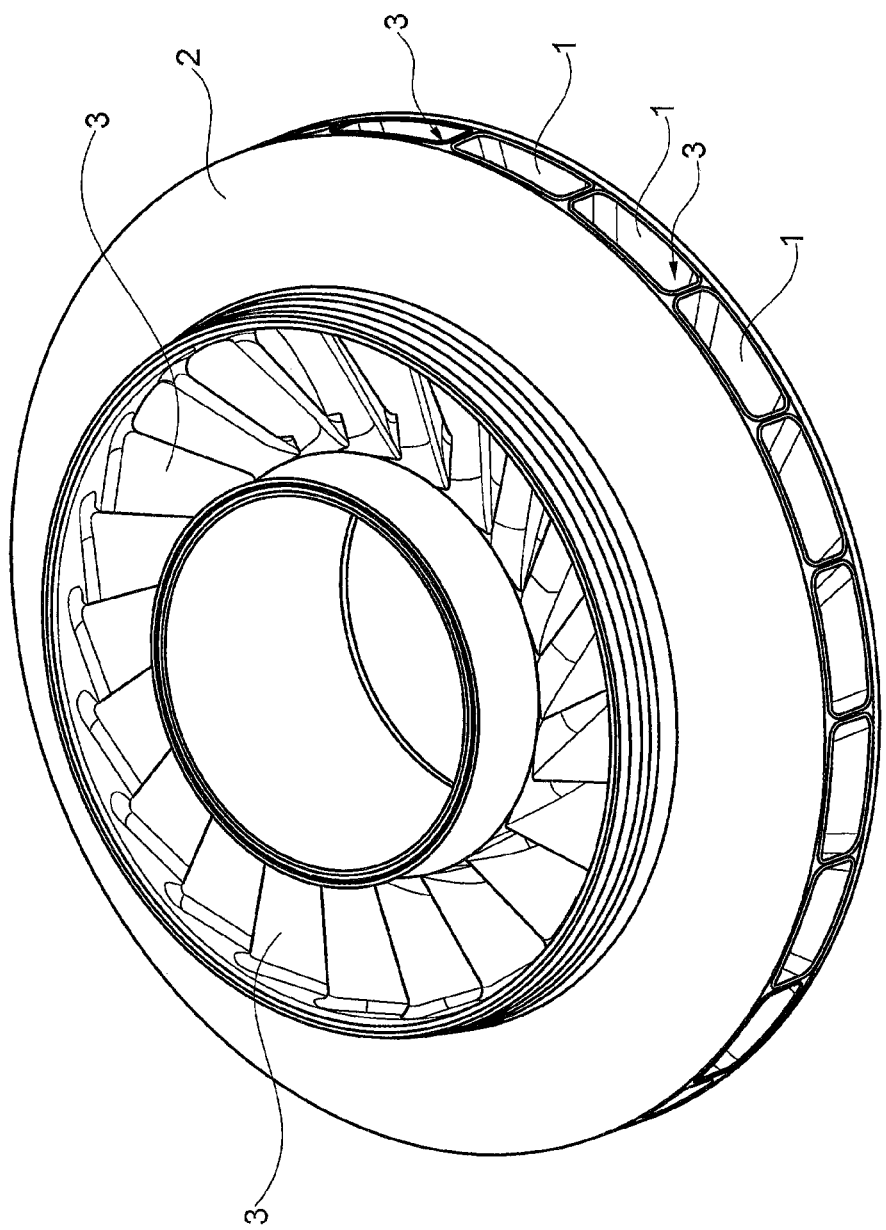
FIG. 1 shows a perspective view of a centrifugal impeller according to the prior art.
Figure 2:
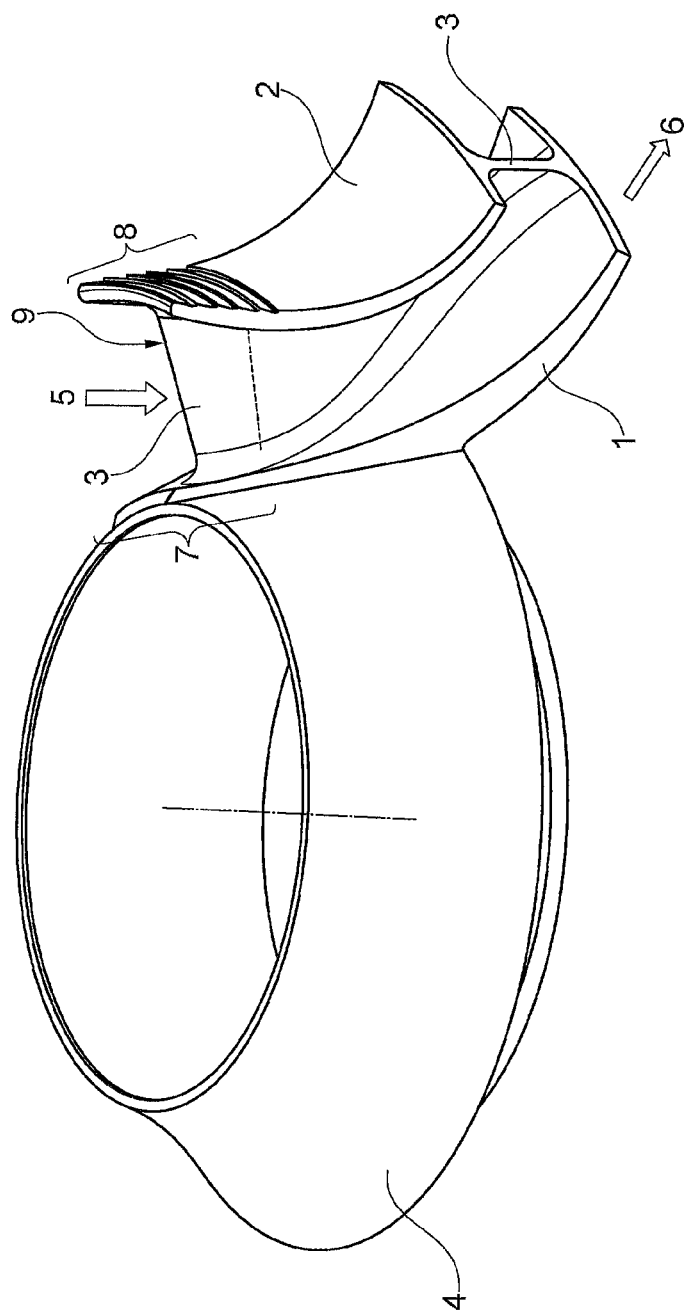
FIG. 2 shows a perspective view of a detail of the impeller of FIG. 1, specifically this figure shows only one blade as well as an adjacent portion of the root and an adjacent portion of the shroud as if the rest of the impeller would have been cut away.

The impeller of FIG. 1 (see also FIG. 2) is a closed-type centrifugal impeller and has a main body with a root 1, a shroud 2 and a plurality of blades 3; the blades 3 connect the root 1 and the shroud 2. According to this solution, there is a hub 4 separate from the root 1 and connected to the root 1; very often they form a single piece that is usually called simply "hub". The root 1, the shroud 2 and the plurality of blades 3 define a plurality of channels for fluid flow during operation of the impeller. The fluid enters into a channel according to a substantially axial direction as shown by arrow 5 in FIG. 2, flows along the channel, and exits from the channel according to a substantially radial direction as shown by arrow 6 in FIG. 2. Therefore, considering the fluid flow, a front part of the impeller is defined comprising a front part of the root 7, a front part of the shroud 8 and a front part of each blade that starts from the leading edge 9 of the blade and ends at a certain distance from the leading edge 9 (see dashed line in FIG. 2); the front part of the impeller is the first one that gets in contact with the fluid provided at the inlet of the impeller.

An embodiment of an improved impeller will be described in the following with reference to the figures from 3 to 8. It is to be noticed that the shape, size and surfaces of the impeller of FIG. 3 correspond to the shape, size and surfaces of the impeller of FIG. 1; in particular, its root is integral with a hub; the difference consists in its mechanical construction and its materials.

Figure 3:
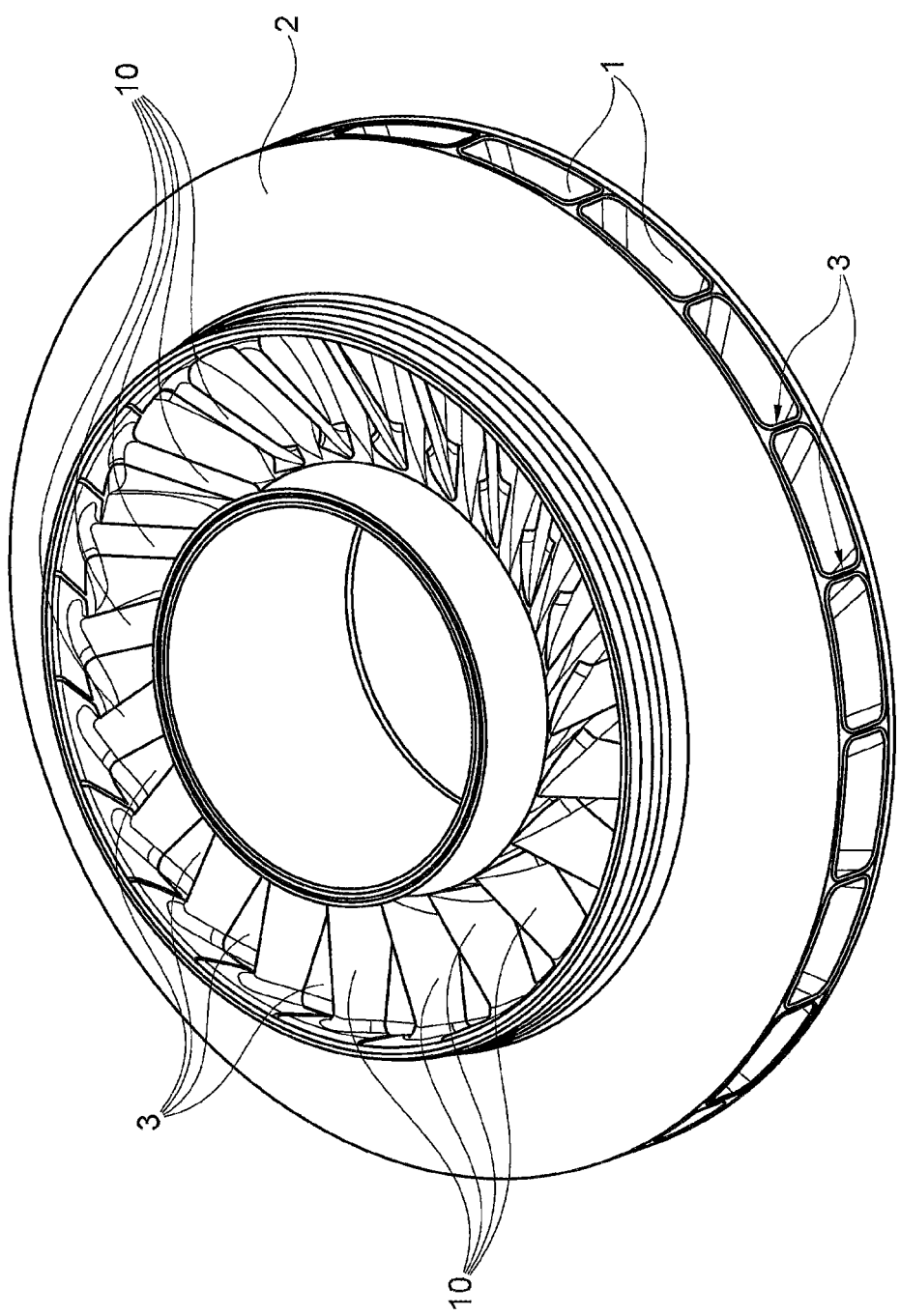
FIG. 3 shows a perspective view of a centrifugal impeller according to an embodiment of the present invention.

In this embodiment, the impeller includes protection elements 10 that are associated to the blades 3 and constitute at least the front part of the blades 3. FIG. 3 shows globally a plurality of protection elements 10 associated to a corresponding plurality of blades; FIG. 4 shows in greater detail a first end (i.e. the "shroud end") of some protection elements 10; FIG. 5 shows in greater detail a second end (i.e. the "root end") of some protection elements 10.

Figure 6:
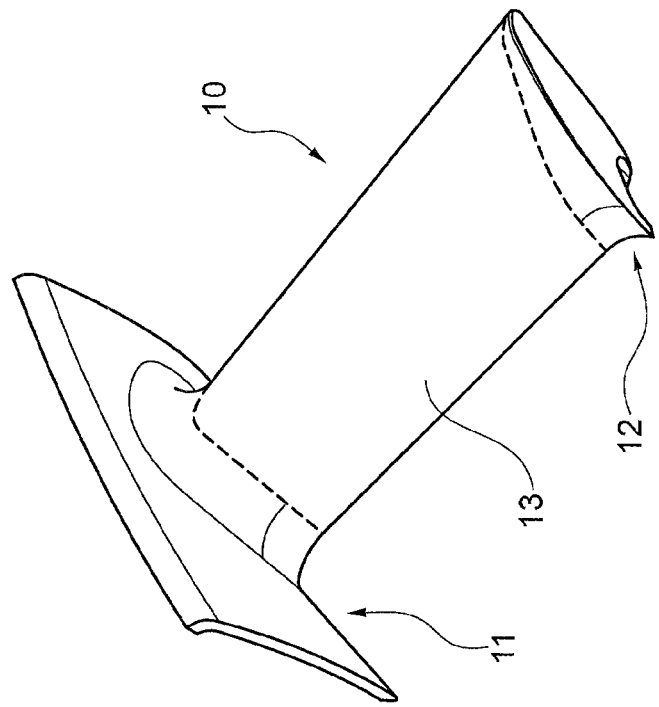
FIG. 6 shows a component, namely a protection element, of the impeller of FIG. 3.

FIG. 6 shows one of the protection elements 10 of the impeller of FIG. 3 removed from the main body of the impeller; it consists of a separate body, i.e. it is not a layer or a simple coating and therefore it is self-supporting; it is in particular a single-piece body. It includes a root portion 12 (see also FIG. 7), a shroud portion 11 (see also FIG. 8) and a blade portion 13.

Figure 8:
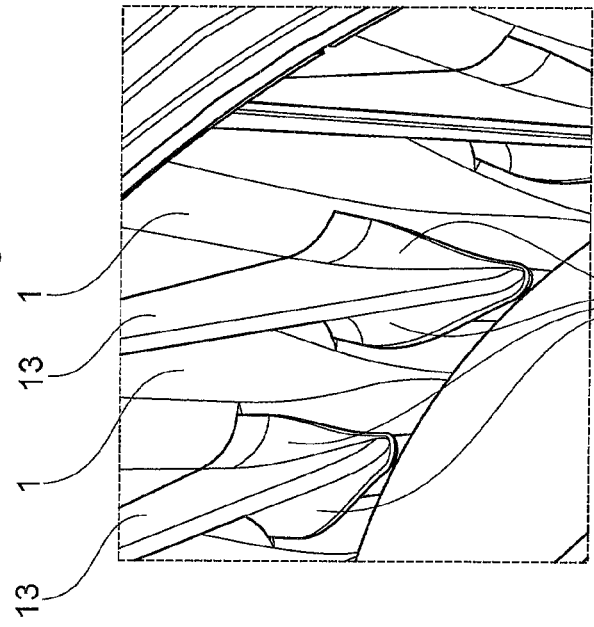
FIG. 8 shows a fourth detail in enlarged view of the impeller of FIG. 3.

The protection elements 10 constitute also at least partially the front part of the root 1; this is the purpose of root portions 12 of elements 10 (see e.g. FIG. 8). FIG. 8 shows that, according to this embodiment, the root portions 12 of consecutive elements 10 are distant from each other.

Figure 7:
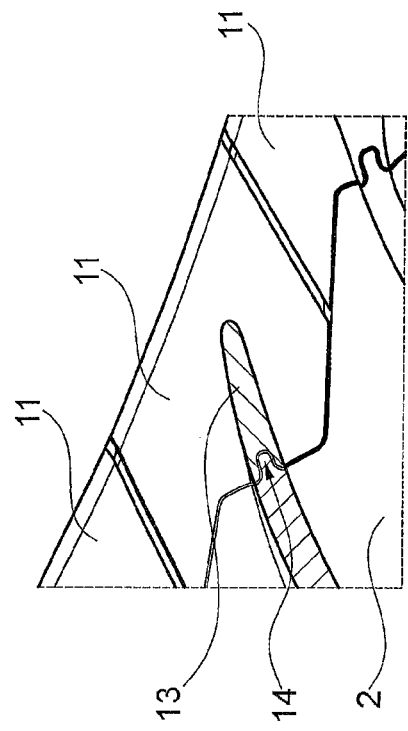
FIG. 7 shows a third detail in enlarged view of the impeller of FIG. 3.

The protection elements 10 constitute also at least partially the front part of the shroud 2; this is the purpose of shroud portions 11 of elements 10 (see e.g. FIG. 7). FIG. 7 shows that, according to this embodiment, the shroud portions 11 of consecutive elements 10 are perfectly adjacent to each other so that, internally, the front part of the shroud 2 is entirely made by the elements 10.

In the embodiment of FIG. 6, the protection elements constitute partially both the root and the shroud.

In the embodiment of FIG. 3, the main body of the impeller is made of metal; it may be made of a carbon steel, a low-alloy steel, a precipitation hardening stainless steel, a martensitic stainless steel, a titanium base alloy, or a nickel base alloy. These materials have a good mechanical resistance.

In the embodiment of FIG. 3, the protection elements 10 are made of metal; they may be made of a cobalt base alloy, a nickel base alloy, a titanium base alloy, a precipitation hardening stainless steel, or a martensitic stainless steel. These materials have a good erosion resistance, in particular resistance to liquid droplets erosion; accordingly, these elements provide protection against hitting liquid droplets both as they are able to withstand these collisions and also to the rest of the impeller, i.e. the main body.

If a cobalt base alloy is used, in embodiments, a chromium content greater than 20% may also be provided.

If a nickel base alloy is used, in embodiments, a chromium content greater than 12% may also be provided.

These two kinds of materials, especially when they contain chromium, are particularly useful for being used in those applications with a high risk of wet operation and/or with a high wet rate although momentaneous.

In embodiments, the material of the protection elements is different from the material of the main body of the impeller, but they are both metal materials.

In one aspect, there are two ways to produce such protection elements: additive manufacturing, and powder metallurgy, in particular hot isostatic pressing.

These manufacturing processes, in particular the second one, may be used for manufacturing also the main body.

The protection elements are permanently attached to the main body of the impeller; in fact, as for most of the operating time of the impeller there are no (or very few) droplets or particles at the inlet of the impeller, an appropriate selection of the material of the protection elements is sufficient for a very long lifetime of the protection elements and therefore a very long life time of the whole impeller.

The protection elements may be attached to the blades and/or the root and/or the shroud of the main body of the impeller. Various possibilities exist for such attachment: brazing, welding, gluing, shrink fitting. Furthermore, more than one technique may be used for the same impeller; for example, the blade portion of the protection elements may be attached to the blades of the main body by shrink fitting, the root portion of the protection element may be attached to the root of the main body by welding, and the shroud portion of the protection element may be attached to the shroud of the main body by welding.

In the embodiment presently described, the main body, in particular its blades, include protrusions for facilitating the attachment of the protection elements, in particular their blade portions, to the main body; FIG. 7 shows a cross-section of the blade portion 13 of a protection element attached to a blade of the main body thanks to a protrusion 14 of the main body and a recess of the protection element. The situation may be reversed, i.e. protrusion of the protections elements and recesses of the main body. Furthermore, a combination of these two possibilities may be used for example in different portions of the protections elements and main body.

In the embodiment of FIG. 3 and FIG. 6, each of the protection elements 10 consists of a single body.

Alternatively, it is possible to the protection elements may be grouped into a number of single bodies; for example, if the impeller includes 24 blades, 24 protection elements will be used, and 12 single bodies if a 2 protection elements form a single body or 8 single bodies if a 3 protection elements form a single body or 6 single bodies if a 4 protection elements form a single body, etc.

Figure 9C:
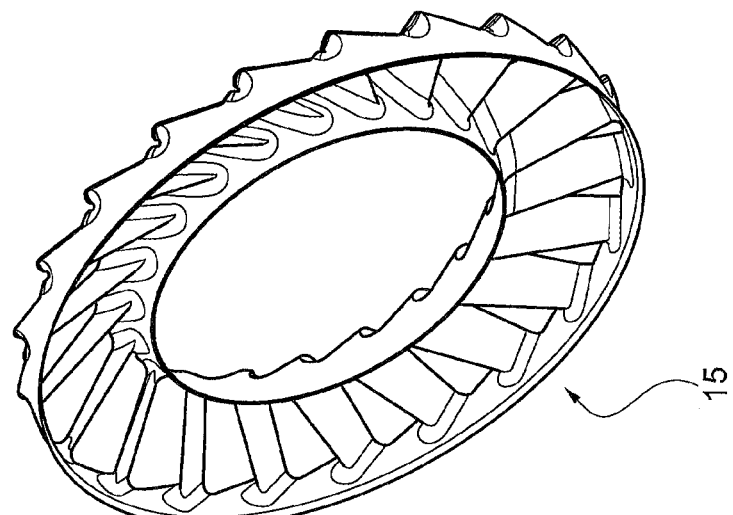
FIG. 9 shows three different views (FIG. 9A=front view, FIG. 9B=lateral view, FIG. 9C=front perspective view) of an annular single protection body according to another embodiment of the present invention.
Figure 9B:
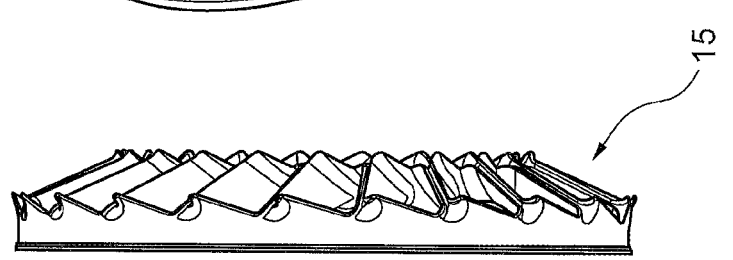
Figure 9A:
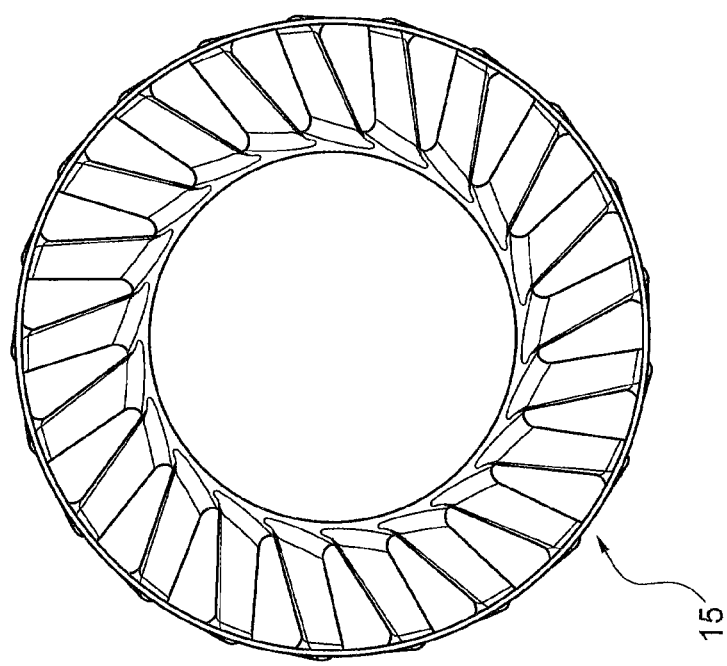
Figure 10:
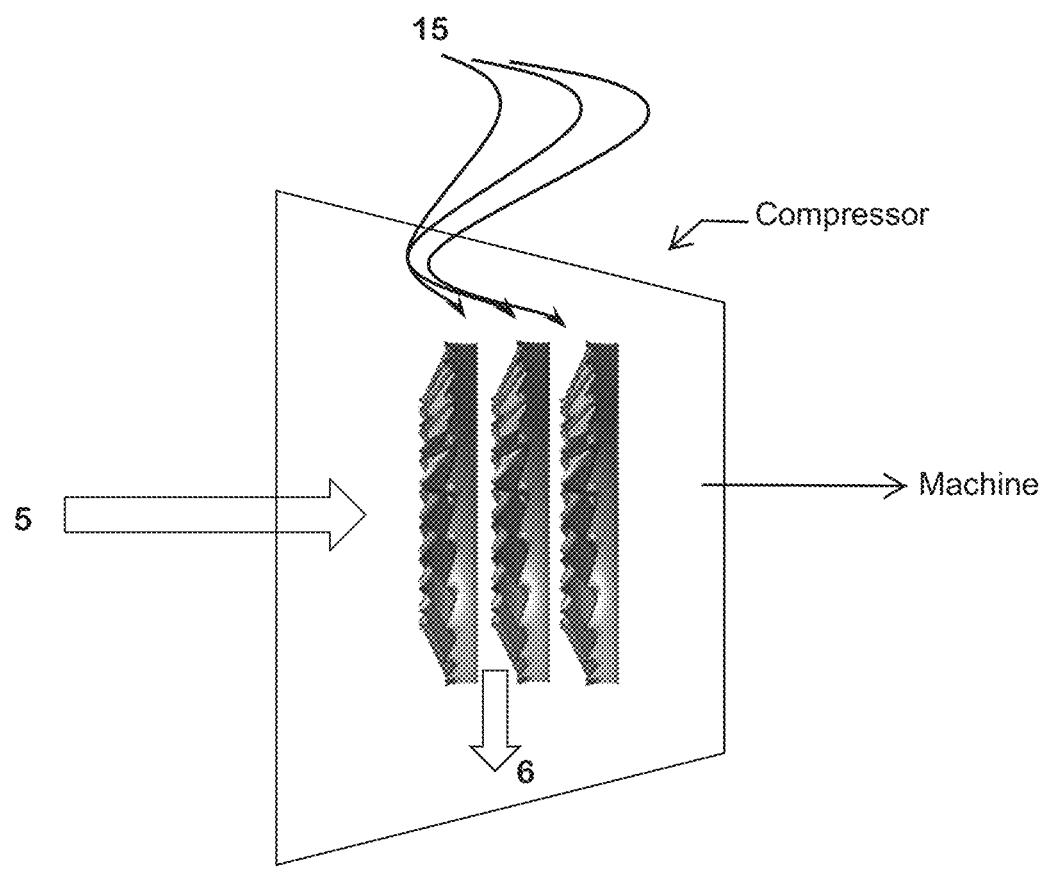
FIG. 10 depicts an embodiment of a centrifugal compressor, including a plurality of impellers according to the present invention, in fluid communication with a machine.

In the embodiment of FIG. 9, all of the protection elements form an annular single protection body 15. Body 15 includes a root portion, a shroud portion and a plurality of blade portions connecting the root portion and the shroud portion.

Body 15 is attached to the front side of the main body of the impeller.

In an embodiment, such attachment is permanent (i.e. not removable or replaceable) for the reason already set out.

Such attachment may be realized as already described. Anyway, in the case of an annular single protection body, an attachment means, such as nuts and bolts may be used. For example, nuts and bolts may be used for attaching the shroud portion of the protection body to the shroud portion of the main body of the impeller and/or the root portion of the protection body to the root portion of the main body of the impeller.

Impellers with protection elements are typically used for centrifugal compressors.

In an embodiment, due to the purpose of the protection elements, if the compressor includes a plurality of cascaded impellers, protection elements are used at least or only for the first impeller where erosion is more likely to occur.

In order to achieve a good protection, the protection elements are shaped and arranged to receive all the input fluid flow from the compressor inlet.

Such a compressor is used in a machine for compressing an input fluid at its inlet.

Thanks to the protection elements, the inlet of the machine may be directly connected to the inlet of the compressor. In this embodiment, filters and separators may be avoided in the machine.

Based on the embodiments just disclosed, a method of protecting the front side of an impeller of a centrifugal compressor from impacts of liquid droplets in the input fluid flow includes the step of permanently arranging protection elements at the front side of the impeller. As already said, the protection elements may be made of a cobalt base alloy, a nickel base alloy, a titanium base alloy, a precipitation hardening stainless steel, or a martensitic stainless steel.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An impeller comprising:
    a main body with a root defining a front part;
    a shroud defining a front part;
    a plurality of blades connecting the root and the shroud, each blade of the plurality of blades comprising a leading edge and a front part including the leading edge and a segment of the blade extending a distance from the leading edge; and
    a plurality of protection elements, each protection element of the plurality of protection elements defining a single piece body comprising a blade portion associated with a corresponding blade of the plurality blades and constitutes at least the front part of said corresponding blade, a root portion forming at least partially the front part of the root and a shroud portion forming at least partially the front part of the shroud,
    wherein the plurality of protection elements are adjacent relative to each other so that, internally, the front part of the shroud is entirely made by the plurality of protection elements.

2. The impeller of claim 1, wherein the main body is made of metal, wherein the metal is a carbon steel, a low alloy steel, a precipitation hardening stainless steel, a martensitic stainless steel, a titanium base alloy, or a nickel base alloy.

3. The impeller of claim 1, wherein the plurality of protection elements are made of metal, wherein the metal is a cobalt base alloy, a nickel base alloy, a titanium base alloy, a precipitation hardening stainless steel, or a martensitic stainless steel.

4. The impeller of claim 1, wherein the plurality of protection elements are produced by additive manufacturing.

5. The impeller of claim 1, wherein the plurality of protection elements are produced by powder metallurgy.

6. The impeller of claim 5, wherein the plurality of protection elements are produced by hot isostatic pressing.

7. The impeller of claim 1, wherein the plurality of protection elements are permanently attached to the main body.

8. A centrifugal compressor comprising an impeller according to claim 1.

9. The centrifugal compressor of claim 8, comprising a plurality of cascaded impellers, wherein at least a first impeller of the cascaded impellers is according to claim 1.

10. The centrifugal compressor of claim 8, wherein the plurality of protection elements are configured to extend to receive all of an input fluid flow from a compressor inlet.

11. A machine for compressing an input fluid at its inlet, comprising a centrifugal compressor according to claim 8 for compressing the input fluid.

12. The machine of claim 11, wherein the inlet of the machine is directly connected to an inlet of the centrifugal compressor.

* * * * *